(12) United States Patent
Chacon (10) Patent No.: US 10,511,211 B1
(45) Date of Patent: Dec. 17, 2019

(54) TRIP REDUCTION TOOL FOR A WIND TURBINE POWER SYSTEM

(71) Applicant: General Electric Company, Schenectady, NY (US)

(72) Inventor: Joseph Lawrence Chacon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/117,108

(22) Filed: Aug. 30, 2018

(51) Int. Cl.
*H02K 11/20* (2016.01)
*F03D 7/04* (2006.01)
*F03D 9/25* (2016.01)
*H02H 1/00* (2006.01)
*H02H 7/06* (2006.01)
*H02K 7/18* (2006.01)

(52) U.S. Cl.
CPC ............ *H02K 11/20* (2016.01); *F03D 7/042* (2013.01); *F03D 9/255* (2017.02); *H02H 1/0007* (2013.01); *H02H 7/06* (2013.01); *F05B 2270/107* (2013.01); *F05B 2270/20* (2013.01); *H02K 7/183* (2013.01)

(58) Field of Classification Search
USPC ........................................................ 318/156
See application file for complete search history.

(56) References Cited

U.S. PATENT DOCUMENTS

| | | | |
|---|---|---|---|
| 5,907,192 A * | 5/1999 | Lyons ............... | F03D 7/0224 290/42 |
| 9,528,494 B2 | 12/2016 | Gao et al. | |
| 9,759,192 B2 | 9/2017 | Perley et al. | |
| 2004/0253093 A1* | 12/2004 | Shibata ............... | F03D 7/0204 415/4.1 |
| 2006/0267560 A1* | 11/2006 | Rajda ................. | G05F 1/70 323/209 |
| 2009/0299697 A1* | 12/2009 | Hamby ................ | F03D 7/0224 702/182 |
| 2010/0332272 A1* | 12/2010 | Ong .................... | F03D 7/0292 705/7.36 |
| 2012/0061961 A1* | 3/2012 | Yasugi ................ | F03D 7/0284 290/44 |
| 2015/0008673 A1 | 1/2015 | Damen | |

(Continued)

FOREIGN PATENT DOCUMENTS

CN        105888988 A        8/2016

*Primary Examiner* — Bentsu Ro (74) *Attorney, Agent, or Firm* — Dority & Manning, P.A.

(57) ABSTRACT

A trip reduction tool for a wind turbine power system includes a capacitor assembly configured to provide multiple capacitance levels for the power system, including e.g. a first level of capacitance during a learning phase of the tool. The tool also includes one or more processors communicatively coupled to the capacitor assembly that is configured to monitor a plurality of electrical devices of the power system for trips during the learning phase. When a trip is detected, the processor(s) collects data and determines a location of the trip. When the location of the trip is located in an electrical device that corresponds to a weak link of the power system, the processor(s) determines a second level of capacitance for the power system based on the collected data. In addition, the processor(s) provides the second level of capacitance at the weak link of the power system to reduce future trips of the electrical device.

20 Claims, 10 Drawing Sheets

(56) References Cited

U.S. PATENT DOCUMENTS

2016/0118786 A1 4/2016 Zhu et al.
2017/0226989 A1 8/2017 Hammerum et al.
2019/0036343 A1* 1/2019 Nelson .................... H02J 3/12

* cited by examiner

TRIP REDUCTION TOOL FOR A WIND TURBINE POWER SYSTEM

FIELD

The present disclosure relates generally to wind turbines and, more particularly, to a trip reduction tool for a wind turbine power system that also includes improved ride-through capabilities.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

More specifically, some wind turbines, such as wind-driven doubly-fed induction generator (DFIG) systems or full power conversion systems, include a power converter, e.g. with an AC-DC-AC topology. Standard power converters typically include a bridge circuit, a power filter and optionally a crowbar circuit. In addition, the bridge circuit typically includes a plurality of cells, for example, one or more power switching elements and/or one or more diodes.

Such wind turbines can experience costly down time whenever a power converter, or other electrical devices, experiences a trip fault. Investigating the cause of the various trips can be time consuming and may require offsite or onsite root cause analysis. In addition, nuisance trips can cripple the availability of a wind turbine. The hardest or most difficult trips, which are the intermittent trips that usually cannot be troubleshot through traditional means because such trips cannot be repeated, generally abruptly and forcibly shut down the wind turbine and almost always require an operator to reset the fault. In other words, intermittent trips may be embedded in a circuit card, where repair and/or replacement can be difficult (if not impossible), time-consuming, and costly. In contrast, soft trips generally refer to trips that gently shut down the operation of the wind turbine and often reset automatically.

Figure 1:
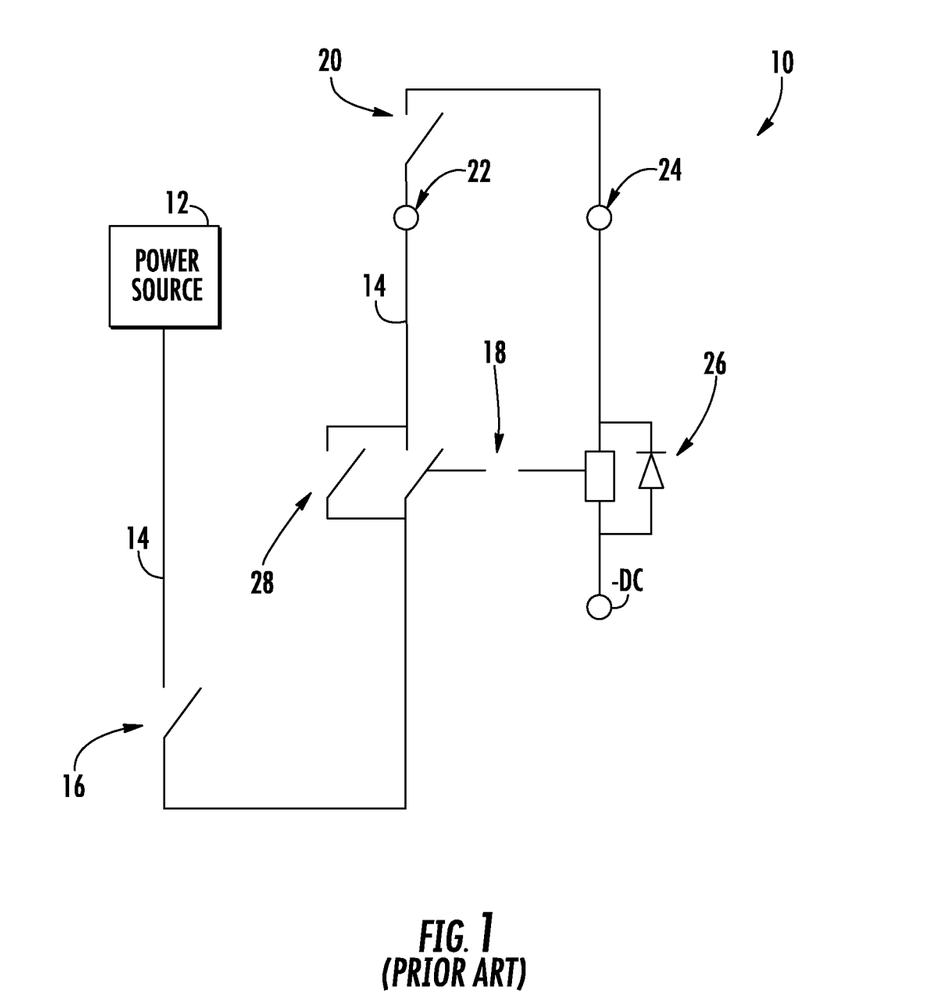
FIG. 1 illustrates a simplified, schematic diagram of a circuit diagram of a wind turbine power system according to conventional construction.

An example circuit diagram 10 of one embodiment of a simplified wind turbine power system is illustrated in FIG. 1. As shown, the illustrated circuit diagram 10 includes a power supply 12 (sometimes located uptower) with a circuit 14 that goes downtower to monitor one or more first electrical devices 16. In addition, as shown, the circuit 14 goes back uptower to monitor one or more second electrical devices 18, across a first slip ring 22 to monitor one or more third electrical devices 20, e.g. located in the wind turbine hub. Moreover, the circuit 14 travels back across a second slip ring 24 to a relay coil 26 associated with the second electrical device 18. As such, when the relay coil 26 loses power, the relay coil 26 electrically disconnects the circuit 14 and can only be reset when all of the electrical devices 16, 18, 20 are closed and a reset 28 is actuated.

In this illustrated circuit diagram 10, only three devices are illustrated. Wind turbine power systems generally include more than three devices, e.g. a dozen or more devices. Further, each of the devices is typically associated with nuances that make troubleshooting difficult. Even if troubleshooting could be completed, many of the devices are very expensive to replace. The relay coil 26 of the circuit diagram 10 is usually hypersensitive. In most cases, the relay coil 26 responds quickly (e.g. within four (4) milliseconds (ms)) and disconnects when the voltage is less than 80%. As such, conventional circuit diagrams of wind turbine power systems provide minimal ride-thru capability if needed.

Figure 2:
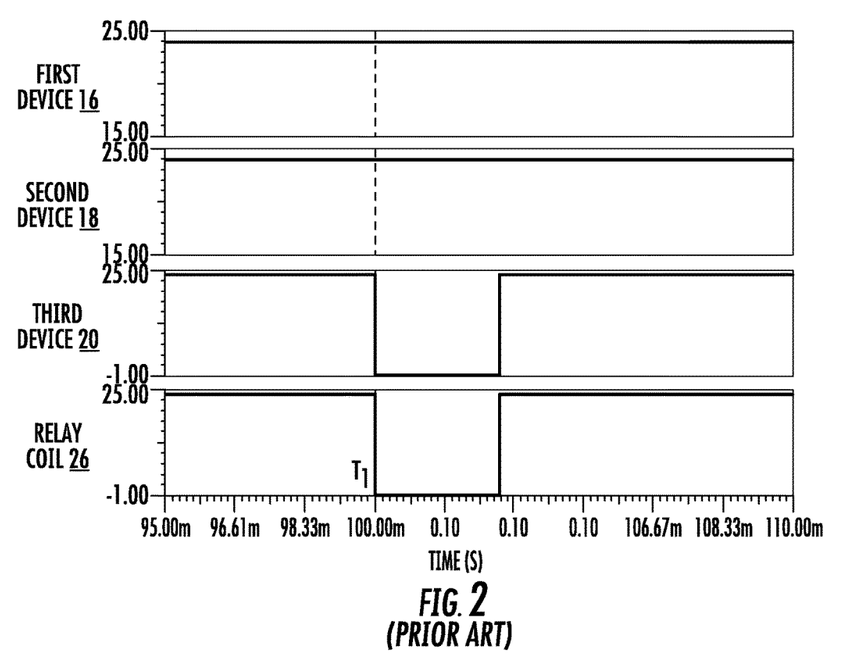
FIG. 2 illustrates a timing diagram representing operation of a circuit diagram of a wind turbine power system after a trip event of a short duration occurs according to conventional construction.
Figure 3:
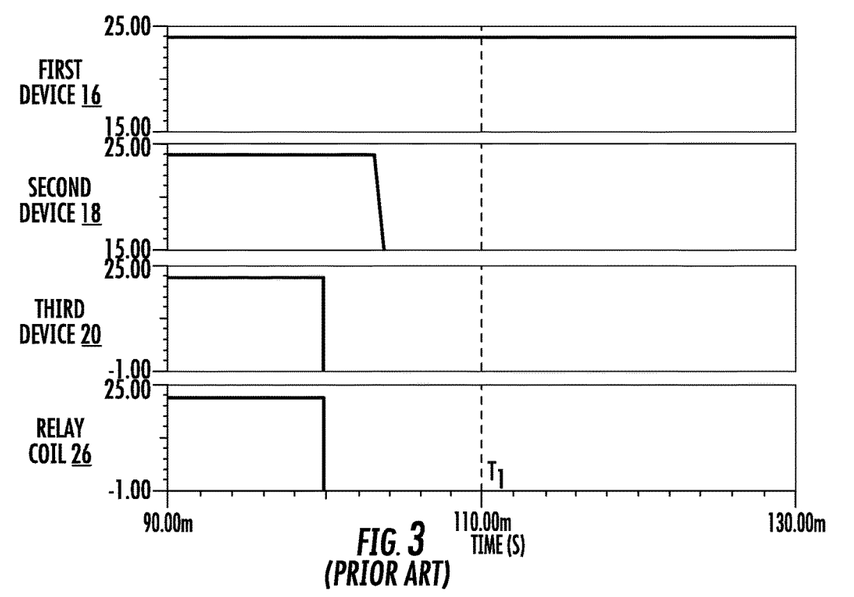
FIG. 3 illustrates a timing diagram representing operation of a circuit diagram of a wind turbine power system after a trip event of a longer duration occurs according to conventional construction.

The conventional circuit diagram 10 of FIG. 1 is further explained in the timing diagrams of FIGS. 2 and 3. As shown in FIG. 2, when a trip event occurs at time $T_1$, the relay coil 26 disconnects. As shown in FIG. 2, the first and second electrical device(s) 16, 18 are capable of riding through the trip event because the event is very brief. In contrast, as shown, the third electrical device 20 drops out for a brief time period (e.g. about 3 ms) in response to the brief trip event. FIG. 3, however, illustrates a trip event of a longer duration. Thus, as shown, the first electrical device(s) 16 is capable of riding through the trip event, but still causes the entire circuit 14 to drop out. Moreover, as shown, the third electrical device(s) 20 drops out for a brief time period (e.g. about 10 ms), whereas the second electrical device(s) 18 fails to ride through the trip event because the relay coil 26 is too sensitive.

Thus, a system and method that addresses the aforementioned issues would be advantageous. Accordingly, the present disclosure is directed to a system and method for reducing hard trips in a wind turbine power system that also includes ride-through capabilities.

BRIEF DESCRIPTION

Aspects and advantages of the invention will be set forth in part in the following description, or may be obvious from the description, or may be learned through practice of the invention.

In one aspect, the present disclosure is directed to a trip reduction tool for an electrical circuit of a wind turbine power system. The trip reduction tool includes a capacitor assembly configured to provide multiple capacitance levels for the electrical circuit. The multiple capacitance levels include, at least, a first level of capacitance during a learning phase of the trip reduction tool. The trip reduction tool also includes one or more processors communicatively coupled to the capacitor assembly. The processor(s) are configured to perform one or more operations, including but not limited to monitoring a plurality of electrical devices of the electrical circuit for trips during the learning phase. When a trip is detected, the processor collects data associated with the trip and determines a location of the trip based on the collected data. When the location of the trip is located in an electrical device of the plurality of electrical devices that corresponds to a weak link of the electrical circuit, the processor(s) determines a second level of capacitance for the electrical circuit based on the collected data. In addition, the processor(s) provides the second level of capacitance at the weak link of the electrical circuit to reduce future trips of the electrical device.

In one embodiment, the first level of capacitance provides ride-through capability for the plurality of electrical devices during the learning phase of the trip reduction tool, whereas the second level of capacitance provides ride-through capability during standard operation of the wind turbine power system.

In another embodiment, the capacitor assembly is configured to provide the multiple capacitance levels based on different sets of operating conditions of the electrical circuit.

In several embodiments, the weak link of the electrical circuit may correspond to an electrical device of the plurality of electrical devices that experiences a hard trip. As used herein, a hard trip includes any intermittent trip that requires an operator to reset the electrical device after the trip occurs.

In further embodiments, the trip reduction tool may include one or more sensors, a fieldbus, one or more input/output electrical devices, or combinations thereof for monitoring the plurality of electrical devices of the electrical circuit. In such embodiments, the one or more sensors may include voltage sensors, electric current sensors, temperature sensors, humidity sensors, speed sensors, strain gauges, accelerometers, airflow sensors, and/or combinations thereof or similar.

In additional embodiments, the one or more operations may include exporting data associated with one or more critical points of the electrical circuit to an external software platform via the Internet. As used herein, a critical point generally refers to a location in the electrical circuit having a capacity for being the weak link of the circuit.

In particular embodiments, the capacitor assembly may include at least one capacitor. In another embodiment, the capacitor assembly may include a plurality of capacitors. More particularly, in one embodiment, the plurality of capacitors may be connected in parallel.

In certain embodiments, the plurality of electrical devices of the electrical circuit may be, for example, a switching device, a contactor, a relay, a reset, or any other suitable electrical component.

In another aspect, the present disclosure is directed to a method for reducing trips of an electrical circuit of a wind turbine power system connected to a power grid. The method includes installing a trip reduction tool into the electrical circuit. The trip reduction tool includes a capacitor assembly and at least one processor. The capacitor assembly is configured to provide multiple capacitance levels for the electrical circuit including, for example, a first level of capacitance during a learning phase of the trip reduction tool. During the learning phase, the method includes monitoring, via the trip reduction tool, a plurality of electrical devices of the electrical circuit for trips. When a trip is detected, the method includes collecting data associated with the trip via the trip reduction tool. The method also includes determining, via the trip reduction tool, a location of the trip based on the collected data. When the location of the trip is located in an electrical device of the plurality of electrical devices that corresponds to a weak link of the electrical circuit, the method includes determining, via the trip reduction tool, a second level of capacitance for the electrical circuit based on the collected data. Thus, the method also includes providing, via a second capacitor assembly, the second level of capacitance at the weak link of the electrical circuit to reduce future trips of the electrical device.

In one embodiment, the step of installing the trip reduction tool into the electrical circuit may include installing the capacitor assembly of the trip reduction tool across a relay coil of the electrical circuit.

In another embodiment, after determining the second level of capacitance for the electrical circuit, the method may include removing the trip reduction tool except for the capacitor assembly and permanently installing the capacitor assembly into the electrical circuit. It should be understood that the method may be further configured with the additional features and/or to perform the additional method steps as described herein.

In yet another aspect, the present disclosure is directed to a method for reducing trips of an electrical circuit of a wind turbine power system connected to a power grid. The method includes monitoring a plurality of electrical devices of the electrical circuit for trips. When a trip is detected, the method includes collecting data associated with the trip. The method also includes determining a location of the trip based on the collected data. When the location of the trip is located in an electrical device of the plurality of electrical devices that corresponds to a weak link of the electrical circuit, the method includes determining a capacitance level for the electrical circuit based on the collected data. Thus, the method further includes providing the capacitance level at the weak link of the electrical circuit to reduce future trips of the electrical device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a trip reduction tool for a wind turbine power system that also improves ride-through capabilities of the power system. For example, in one embodiment, the trip reduction tool is intended to isolate trips/faults where the trip(s) occur in the wind turbine, learn information about the trip(s) beyond what is available through programmable logic controllers of the wind turbine, ascertain how the trip(s) can be ridden through, and then deploy the ride-thru scheme to the trip(s) such that the trips are reduced permanently.

Accordingly, the trip reduction tool of the present disclosure provides many advantages not present in the prior art. For example, the trip reduction tool can be used in conventional wind turbines to locate hard and/or intermittent faults. In addition, the trip reduction tool aides in troubleshooting because the tool continually monitors the power system, where a quick drop in the system usually electrically latches out the entire circuit, thereby making the original fault almost impossible to locate.

Figure 4:
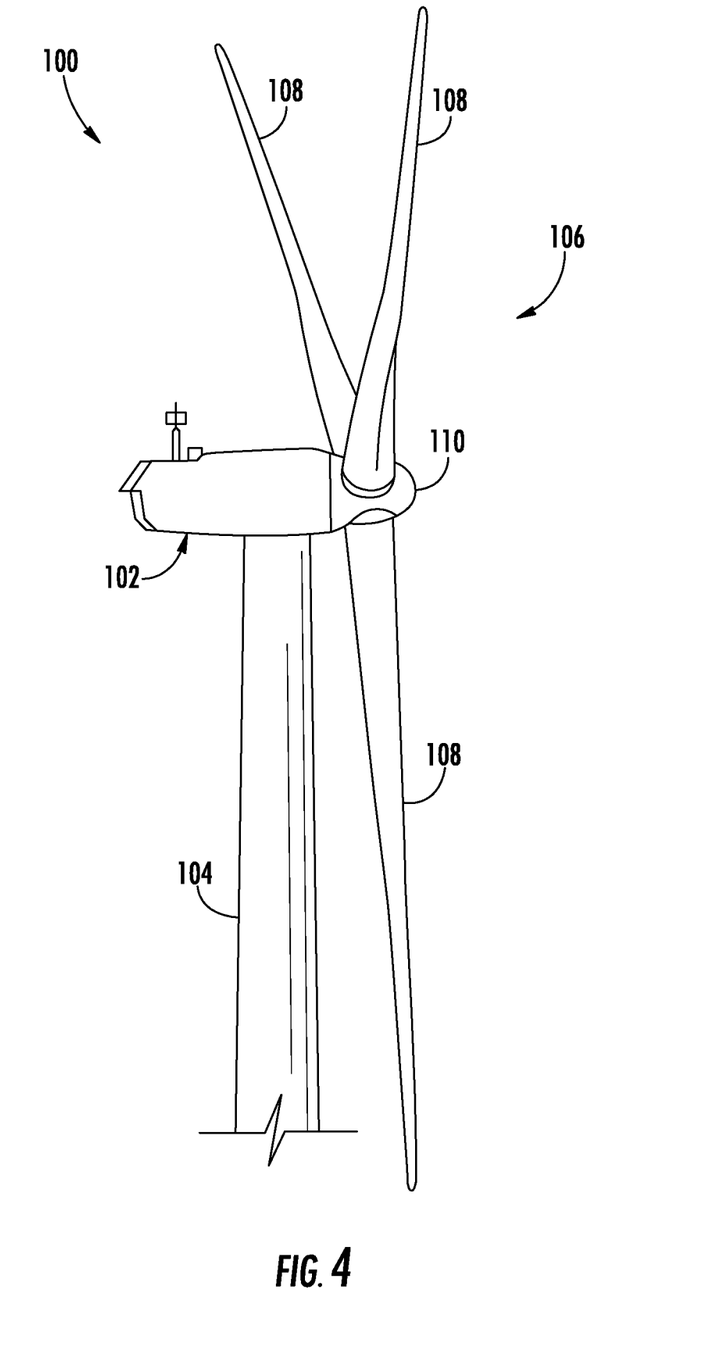
FIG. 4 illustrates a perspective view of a portion of one embodiment of a wind turbine according to the present disclosure.

Referring now to the drawings, FIG. 4 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 5:
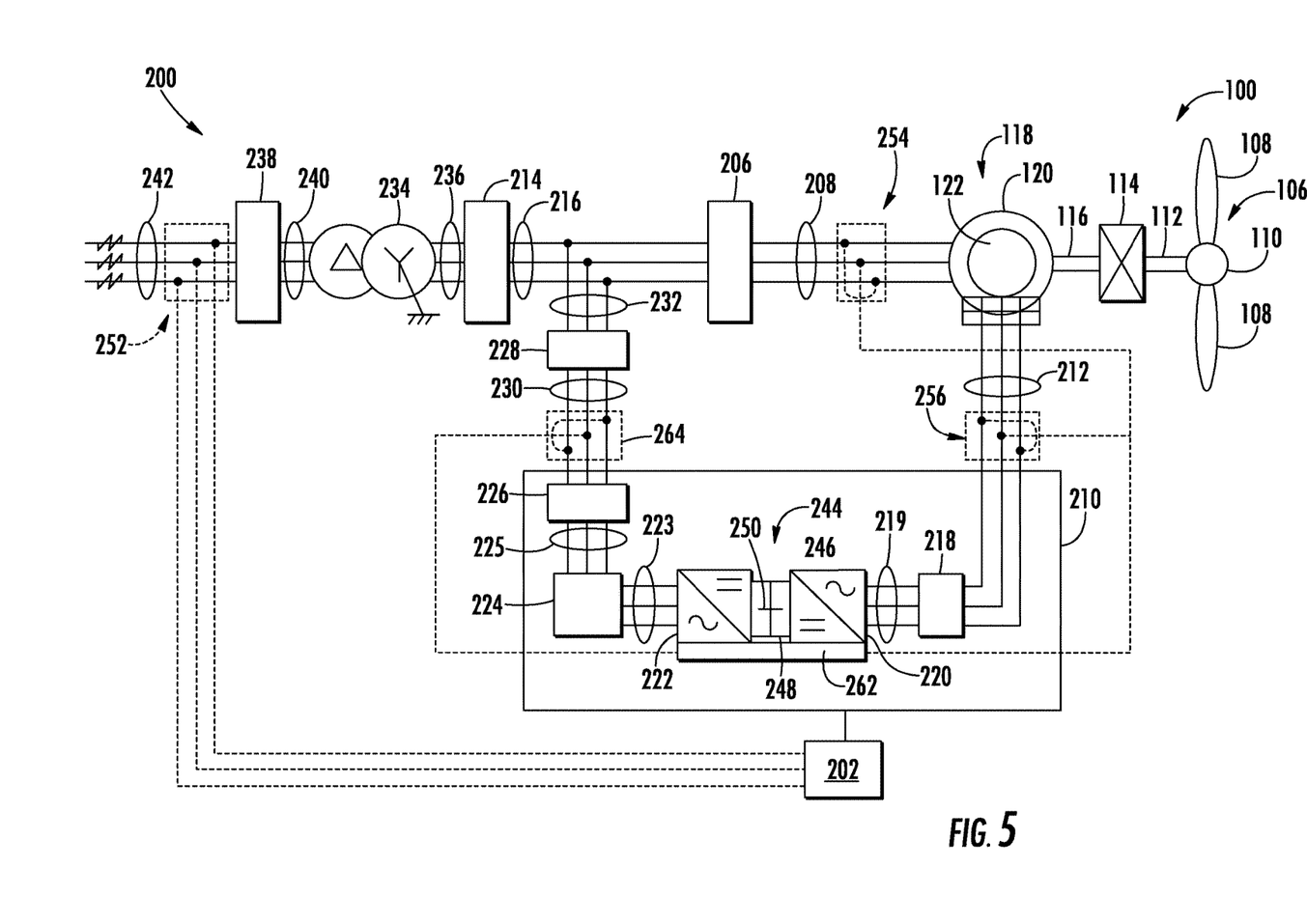
FIG. 5 illustrates a schematic view of one embodiment of an electrical and control system suitable for use with the wind turbine shown in FIG. 1.

Referring to FIG. 5, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

The generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

During operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244.

Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with a converter controller 262 and/or a turbine controller 202 configured to control the operation of the rotor-side power converter 220 and the line-side power converter 222. For example, during operation, the controller 202 may be configured to receive one or more voltage and/or electric current measurement signals from a first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 264 (all shown in FIG. 5), and/or any other suitable sensors. Further, the voltage and electric current sensors 252, 254, 256, 264 may be configured to measure, directly or indirectly, a power output of the wind turbine 100.

In addition, the converter controller 262 is configured to receive one or more voltage and electric current measurement signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264. In addition, the converter controller 262 may be configured with any of the features described herein in regards to the turbine controller 202. Further, the converter controller 262 may be separate from or integral with the turbine controller 202.

Figure 6:
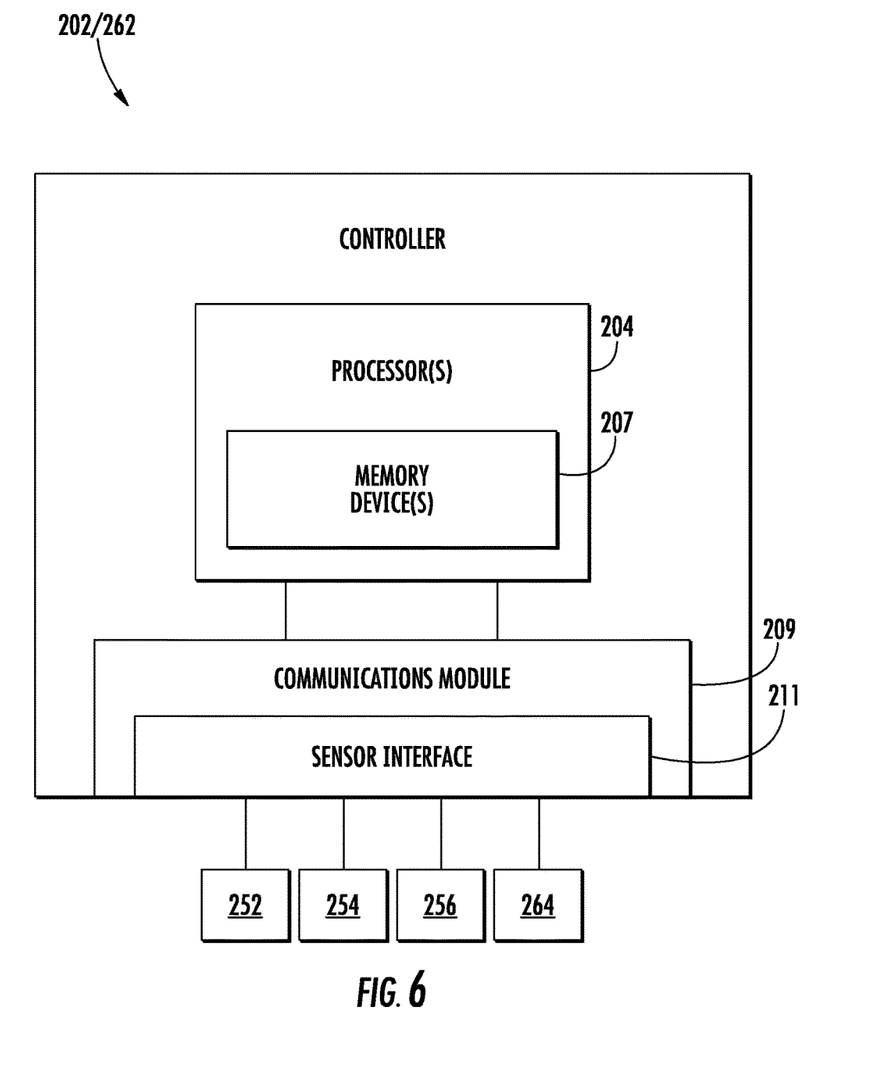
FIG. 6 illustrates a block diagram of one embodiment of suitable components that may be included in a controller according to the present disclosure.

Thus, the wind turbine controller 202, as well as the converter controller 262, is configured to control various components of the wind turbine 100. Accordingly, as shown particularly in FIG. 6, the controller(s) 202, 262 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 5. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264) may be communicatively coupled to the communications module 209 using any suitable means. For example, as shown in FIG. 6, the sensors 252, 254, 256, 264 may be coupled to the sensor interface 211 via a wired connection. However, in other embodiments, the sensors 252, 254, 256, 264 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

It should also be understood that any number or type of sensors may be employed within the wind turbine 100 and at any location. For example, the sensors as described herein may be temperature sensors, Micro Inertial Measurement Units (MIMUs), strain gauges, accelerometers, pressure sensors, humidity sensors, speed sensors, strain gauges, accelerometers, airflow sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 7:
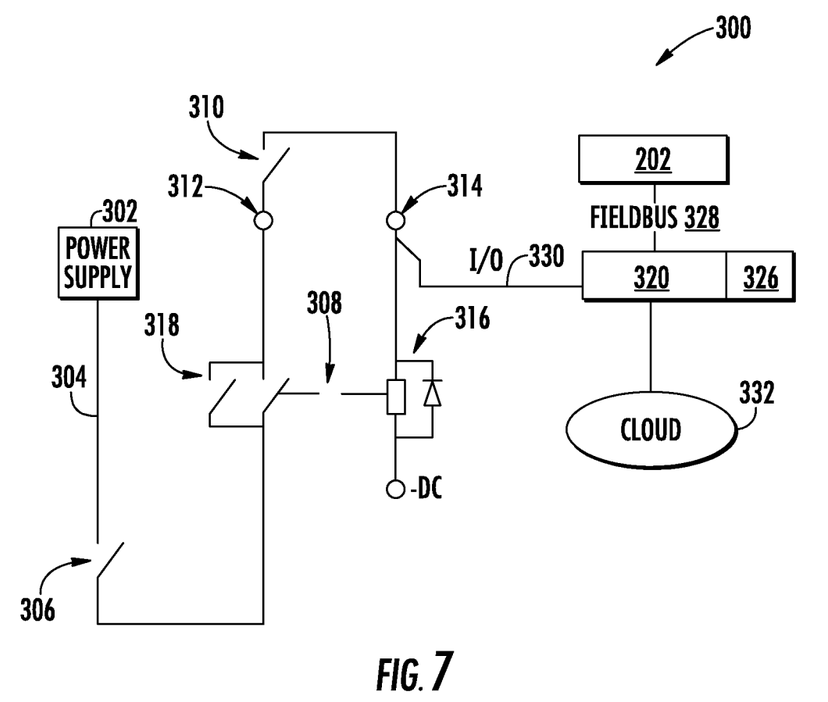
FIG. 7 illustrates a simplified, schematic diagram of one embodiment of a circuit diagram of a wind turbine power system according to the present disclosure.
Figure 8:
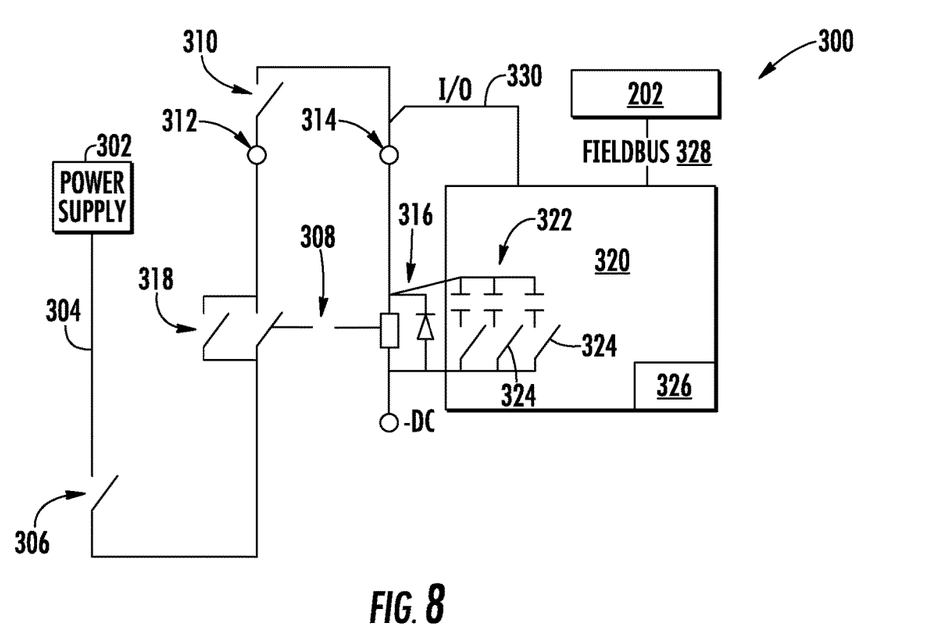
FIG. 8 illustrates a simplified, schematic diagram of another embodiment of a circuit diagram of a wind turbine power system according to the present disclosure.

Referring now to FIGS. 7 and 8, simplified, schematic diagrams of various embodiments of a circuit diagram 300 of a wind turbine power system, such as the wind turbine power system 200 of FIG. 5, are illustrated. As shown, the illustrated circuit diagram 300 includes a power supply 302 (typically located uptower) and a circuit 304 configured to monitor a plurality of electrical devices 306, 308, 310 of the power system 200 for trips/faults. For example, in certain embodiments, the plurality of electrical devices 306, 308, 310 may be, for example, a switching device, a contactor, a relay, a reset, or any other suitable electrical component.

In the illustrated circuit diagram 300, only three electrical devices are illustrated, however, it should be understood that the wind turbine power system 200 may include any number of electrical devices including more than three electrical devices or less than three electrical devices. For example, in the illustrated embodiment, the electrical devices include, at least, one or more downtower first electrical devices 306 and one or more uptower second electrical devices 308. The circuit 304 may also include a first slip ring 312 configured to monitor one or more third electrical devices 310 generally in the hub 110 of the wind turbine 100. Moreover, the circuit 304 may be configured to travel back across a second slip ring 314 to a relay coil 316 associated with the second electrical device(s) 308.

When the relay coil 316 loses power, the coil 316 electrically disconnects the circuit 304 and can only be reset when all of the electrical devices 306, 308, 310 are closed and a reset 318 (optionally associated with the second electrical device(s)) 308 is actuated. As mentioned, each of the electrical devices is typically associated with nuances that make troubleshooting difficult. Further, even if troubleshooting could be completed, the electrical devices can be difficult to repair/replace and the relay coil 316 is usually hypersensitive. As such, the present disclosure includes a trip reduction tool 320 configured to reduce trips of the power system 200 so as to improve ride-through capabilities.

As shown particularly in FIG. 8, the trip reduction tool 320 includes a capacitor assembly 322 configured to provide multiple capacitance levels for the wind turbine power system 200. For example, the multiple capacitance levels may include, at least, a first level of capacitance during a learning phase of the trip reduction tool 320. The learning phase of the trip reduction tool 320 generally refers to the operational phase of the tool in which the circuit is operated to monitor for faults, data regarding the faults is collected, and a desired capacitance level configured to minimize future faults is determined. As such, the capacitor assembly 322 is configured to provide the multiple capacitance levels based on different sets of operating conditions (e.g. voltage, current, etc.) of the wind turbine power system 200. In addition, as shown in FIG. 8, the capacitor assembly 322 may include one capacitor 324 or a plurality of capacitors 324. More particularly, as shown, the plurality of capacitors 324 may be connected in parallel. In alternative embodiments, the capacitors 324 may be connected in series.

The trip reduction tool 320 also includes one or more processors 326 communicatively coupled to the capacitor assembly 322. The processor(s) 326 are configured to monitor the plurality of electrical devices 306, 308, 310 of the wind turbine power system 200 for trips during the learning phase of the trip reduction tool 320. For example, in one embodiment, the plurality of electrical devices 306, 308, 310 may be monitored via at least one of one or more sensors, a fieldbus 328, one or more input/output (I/O) devices 330, or combinations thereof. In such embodiments, the sensor(s) (such as sensors 252, 254, 256, 264) may include voltage sensors, electric current sensors, temperature sensors, humidity sensors, airflow sensors, and/or combinations thereof or similar.

When a trip is detected in the circuit 304, the processor(s) 326 collects data associated with the trip. As shown particularly in FIG. 7, the processor(s) 326 of the trip reduction tool 320 may be communicatively coupled to an external software platform 332 (such as the cloud) via the Internet. In such embodiments, the processor(s) 326 is configured to export the data associated with the trips of the wind turbine power system 200 to the external software platform 332. In addition, the processor(s) 326 is configured to determine a location of the trip based on the collected data. When the location of the trip is located in a device that corresponds to a weak link of the wind turbine power system 200 (such as one of the electrical devices 306, 308, 310), the processor(s) 326 is configured to determine a second level of capacitance for the wind turbine power system 200 based on the collected data. In several embodiments, the weak link of the wind turbine power system 200 may correspond to one of the electrical devices 306, 308, 310, e.g. that experiences a hard trip. As used herein, hard trips generally refers to trips that cause an abrupt and forceful shutdown of the wind turbine 100 and require an operator to reset the electrical devices 306, 308, 310 after the trip occurs, whereas soft trips generally refer to trips that cause a less aggressive shutdown of the wind turbine 100. Both hard and soft trips are intermittent trips that may be difficult to troubleshoot, yet hard trips cause more wear and tear on the wind turbine 100 and should be minimized.

In addition, the processor(s) 326 provides the second level of capacitance at the weak link of the wind turbine power system 200 to reduce future trips of the device. For example, as shown in FIG. 8, the capacitor(s) 324 may remain part of the circuit 304 at the weak link device to reduce trips associated with that device. In one embodiment, the first level of capacitance provides ride-through capability for the electrical devices 306, 308, 310 during the learning phase of the trip reduction tool 320. In addition, the second level of capacitance provides ride-through capability during standard operation of the wind turbine power system 200, i.e. after the trip reduction tool 320 has been removed from the circuit 304.

Figure 9:
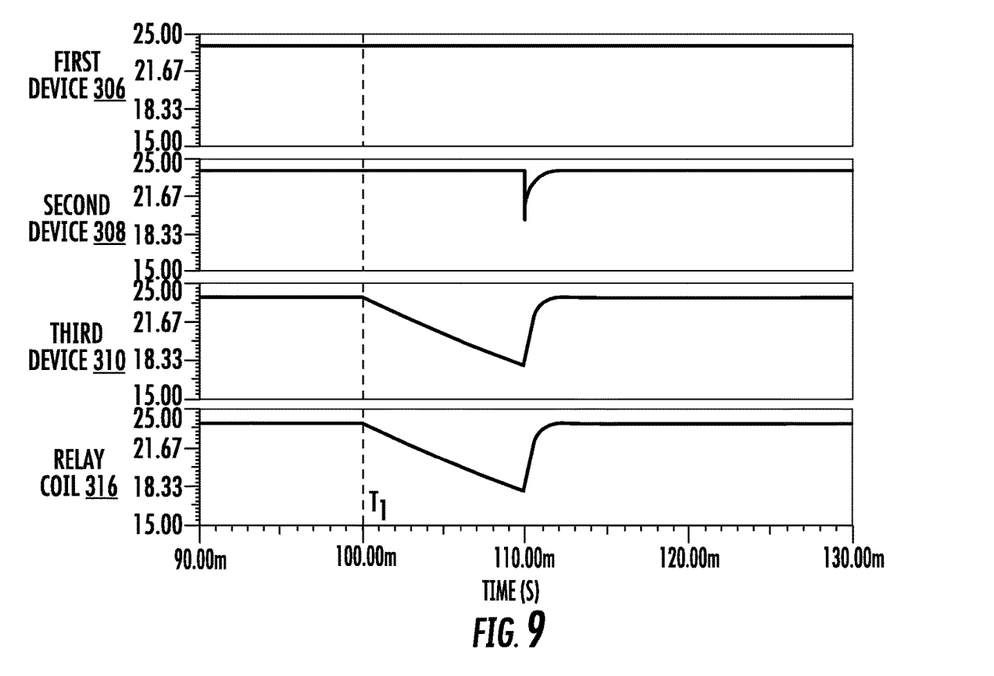
FIG. 9 illustrates a timing diagram representing operation of a circuit diagram of a wind turbine power system after a trip event of a short duration occurs according to the present disclosure.
Figure 10:
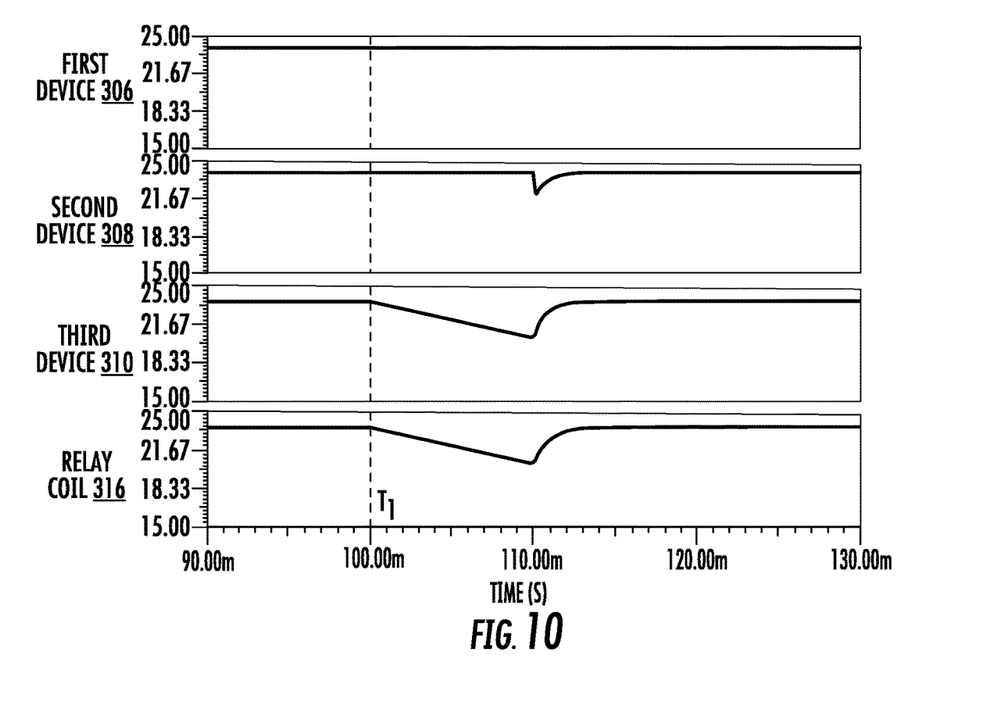
FIG. 10 illustrates another timing diagram representing operation of a circuit diagram of a wind turbine power system after a trip event of a short duration occurs according to the present disclosure.
Figure 11:
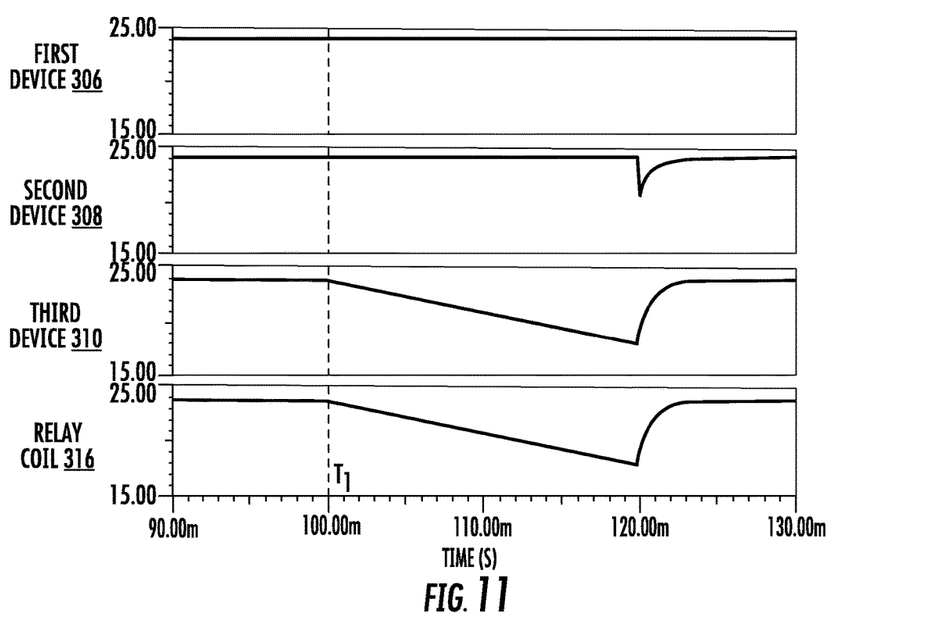
FIG. 11 illustrates a timing diagram representing operation of a circuit diagram of a wind turbine power system after a trip event of a longer duration occurs according to the present disclosure.

Referring now to FIGS. 9-11, various timing diagrams are provided to illustrate advantages of the trip reduction tool 320 of the present disclosure. As shown, an intermittent event occurs at time $T_1$. As shown in FIG. 9, the third electrical device 310 drops out for a brief time period (such as about 10 ms). In addition, as shown, the first and second electrical devices 306, 308 ride through the event (and therefore causing the entire circuit 304 to ride through the event) because the voltage does not drop below a predetermined threshold (such as an 80% threshold for a certain time frame (e.g. 4 ms) because 100 microfarad (µF) is in the circuit 304). As shown in FIG. 10, the third electrical device 310 also drops out for another brief time period (e.g. 10 ms). Similar to FIG. 9, the first and second electrical devices 306, 308 ride through the event (and therefore causing the entire circuit 304 to ride through the event) because the voltage does not drop below the predetermined voltage threshold. As shown in FIG. 11, the third electrical device 310 drops out for a longer time period (e.g. 20 ms), however, the first and second electrical devices 306, 308 ride-thru the event (and therefore causing the entire circuit 304 to ride through the event) because the voltage does not drop below the predetermined threshold (e.g. 80% threshold for 4 ms because 200 µF is in the circuit 304).

Figure 12:
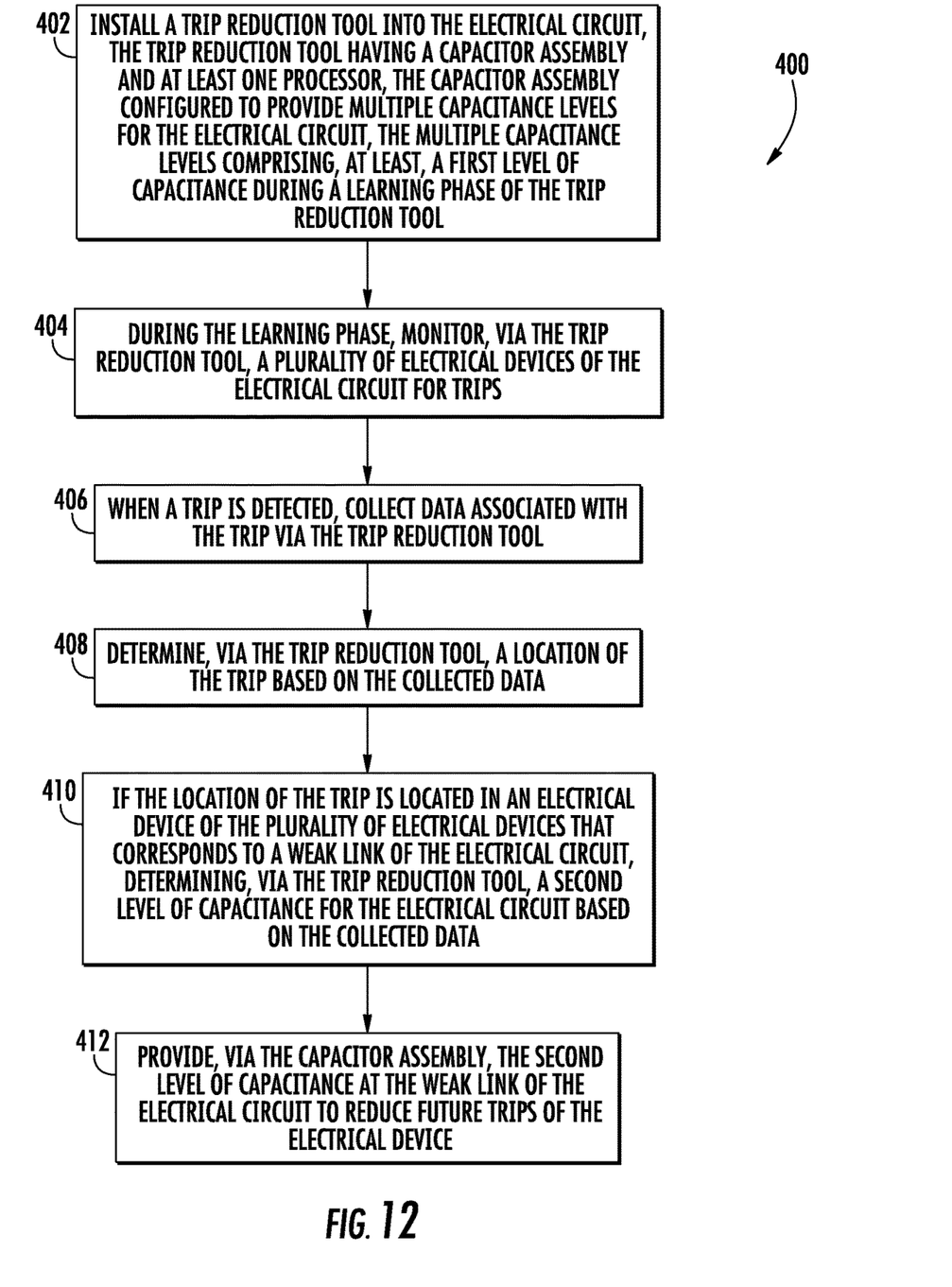
FIG. 12 illustrates a flow diagram of one embodiment of a method for reducing trips of an electrical circuit of a wind turbine power system connected to a power grid according to the present disclosure.

Referring now to FIG. 12, a flow diagram of one embodiment of one embodiment of a method 400 for reducing trips of an electrical device of a wind turbine power system connected to a power grid is illustrated. In general, the method 400 will be described herein with reference to the wind turbine power system 200 shown in FIGS. 3-5 and the trip reduction tool 320 shown in FIGS. 7 and 8. However, it should be appreciated that the disclosed method 400 may be implemented with wind turbines having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 may include installing the trip reduction tool 320 into the wind turbine power system 200. For example, in one embodiment, the capacitor assembly 322 of the trip reduction tool 320 may be installed across the relay coil 316 of the circuit 304. During the learning phase, as shown at (404), the method 400 may include monitoring, via the trip reduction tool 320, the devices 306, 308, 310 of the wind turbine power system 200 for trips. When a trip is detected, as shown at (406), the method 400 may include collecting data associated with the trip via the trip reduction tool 320. As shown at (408), the method 400 may include determining, via the trip reduction tool 320, a location of the trip based on the collected data. When the location of the trip is located in one of the devices 306, 308, 310 that corresponds to a weak link of the wind turbine power system 200, as shown at (410), the method 400 may include determining, via the trip reduction tool 320, a second level of capacitance for the wind turbine power system 200 based on the collected data. Thus, as shown at (412), the method 400 may include providing, via the capacitor assembly 322, the second level of capacitance at the weak link of the circuit 304 to reduce future trips of the device. For example, in one embodiment, after determining the second level of capacitance, the method 400 may include removing the trip reduction tool 320 from the circuit 304 except for the capacitor assembly 322, which can then be installed permanently into circuit 304 to reduce trips long-term.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A trip reduction tool for a wind turbine power system, the trip reduction tool comprising:
    a capacitor assembly configured to provide multiple capacitance levels for an electrical circuit of the wind turbine power system, the multiple capacitance levels comprising, at least, a first level of capacitance during a learning phase of the trip reduction tool; and,
    one or more processors communicatively coupled to the capacitor assembly, the one or more processors configured to perform one or more operations, the one or more operations comprising:
        during the learning phase, monitoring a plurality of electrical devices of the electrical circuit of the wind turbine power system for trips;
        when a trip is detected, collecting data associated with the trip;
        determining a location of the trip based on the collected data;
        when the location of the trip is located in an electrical device of the plurality of electrical devices that corresponds to a weak link of the electrical circuit, determining a second level of capacitance for the electrical circuit based on the collected data; and,
        providing the second level of capacitance at the weak link of the electrical circuit to reduce future trips of the device.

2. The trip reduction tool of claim 1, wherein the first level of capacitance provides ride-through capability for the plurality of electrical devices during the learning phase of the trip reduction tool and the second level of capacitance provides ride-through capability during standard operation of the wind turbine power system.

3. The trip reduction tool of claim 1, wherein the capacitor assembly is configured to provide the multiple capacitance levels based on different sets of operating conditions of the electrical circuit of the wind turbine power system.

4. The trip reduction tool of claim 1, wherein the weak link of the electrical circuit corresponds to an electrical device of the plurality of electrical devices that experiences a hard trip, the hard trip comprising an intermittent trip that requires an operator to reset the electrical device after the trip occurs.

5. The trip reduction tool of claim 1, further comprising at least one of one or more sensors, a fieldbus, one or more input/output electrical devices, or combinations thereof for monitoring the plurality of electrical devices of the electrical circuit.

6. The trip reduction tool of claim 5, wherein the one or more sensors comprise at least one of voltage sensors, electric current sensors, temperature sensors, humidity sensors, speed sensors, strain gauges, accelerometers, or airflow sensors.

7. The trip reduction tool of claim 1, wherein the one or more operations further comprise exporting data associated with one or more critical points of the electrical circuit to an external software platform via the Internet, the one or more critical points of the electrical circuit having a capacity for being the weak link.

8. The trip reduction tool of claim 1, wherein the capacitor assembly comprises at least one capacitor.

9. The trip reduction tool of claim 1, wherein the capacitor assembly comprises a plurality of capacitors.

10. The trip reduction tool of claim 9, wherein the plurality of capacitors are connected in parallel.

11. The trip reduction tool of claim 1, wherein the plurality of electrical devices of the electrical circuit of the wind turbine power system comprises at least one of a switching device, a contactor, a relay, or a reset.

12. A method for reducing trips in an electrical circuit of a wind turbine power system connected to a power grid, the method comprising:
    installing a trip reduction tool into the electrical circuit, the trip reduction tool having a capacitor assembly and at least one processor, the capacitor assembly configured to provide multiple capacitance levels for the electrical circuit, the multiple capacitance levels comprising, at least, a first level of capacitance during a learning phase of the trip reduction tool;
    during the learning phase, monitoring, via the trip reduction tool, a plurality of electrical devices of the electrical circuit for trips;
    when a trip is detected, collecting data associated with the trip via the trip reduction tool;
    determining, via the trip reduction tool, a location of the trip based on the collected data;
    when the location of the trip is located in an electrical device of the plurality of electrical devices that corresponds to a weak link of the electrical circuit, determining, via the trip reduction tool, a second level of capacitance for the electrical circuit based on the collected data; and, providing, via the capacitor assembly, the second level of capacitance at the weak link of the electrical circuit to reduce future trips of the electrical device.

13. The method of claim 12, wherein installing the trip reduction tool into the electrical circuit further comprising installing the capacitor assembly of the trip reduction tool across a relay coil of the electrical circuit.

14. The method of claim 12, further comprising, after determining the second level of capacitance for the electrical circuit, removing the trip reduction tool except for the capacitor assembly and permanently installing the capacitor assembly into the electrical circuit.

15. The method of claim 12, wherein the first level of capacitance provides ride-through capability for the plurality of electrical devices during the learning phase of the trip reduction tool and the second level of capacitance provides ride-through capability during standard operation of the wind turbine power system.

16. The method of claim 12, wherein the capacitor assembly of the trip reduction tool is configured to provide the multiple capacitance levels based on different sets of operating conditions of the electrical circuit.

17. The method of claim 12, wherein the weak link of the electrical circuit corresponds to an electrical device of the plurality of electrical devices that experiences a hard trip, the hard trip comprising an intermittent trip that requires an operator to reset the electrical device after the trip occurs.

18. The method of claim 12, further comprising monitoring the plurality of electrical devices of the electrical circuit via at least one of one or more sensors, a fieldbus, one or more input/output electrical devices, or combinations thereof.

19. The method of claim 12, further comprising exporting data associated with one or more critical points of the electrical circuit to an external software platform via the Internet, the one or more critical points of the electrical circuit having a capacity for being the weak link.

20. A method for reducing trips in an electrical circuit of a wind turbine power system connected to a power grid, the method comprising:

monitoring a plurality of electrical devices of the electrical circuit for trips;

when a trip is detected, collecting data associated with the trip;

determining a location of the trip based on the collected data;

when the location of the trip is located in an electrical device of the plurality of electrical devices that corresponds to a weak link of the electrical circuit, determining a capacitance level for the electrical circuit based on the collected data; and, providing the capacitance level at the weak link of the electrical circuit to reduce future trips of the electrical device.

* * * * *